US012578929B2

(12) United States Patent
Zhai et al.

(10) Patent No.: US 12,578,929 B2
(45) Date of Patent: Mar. 17, 2026

(54) METHOD AND SYSTEM FOR PERFORMING AUTOMATIC SOURCE CODE GENERATION FOR USE IN A DATA TRANSFORMATION PROCESS

(71) Applicant: Royal Bank of Canada, Toronto (CA)

(72) Inventors: Yun Zhai, Toronto (CA); Kai Zheng, Toronto (CA); Wilfredo Oliveros, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 270 days.

(21) Appl. No.: 18/356,980

(22) Filed: Jul. 21, 2023

(65) Prior Publication Data

US 2024/0028304 A1      Jan. 25, 2024

Related U.S. Application Data

(60) Provisional application No. 63/391,634, filed on Jul. 22, 2022.

(51) Int. Cl.
*G06F 8/30*        (2018.01)
*G06F 16/25*       (2019.01)
(52) U.S. Cl.
CPC ............. *G06F 8/30* (2013.01); *G06F 16/254* (2019.01)
(58) Field of Classification Search
None
See application file for complete search history.

(56) References Cited

U.S. PATENT DOCUMENTS 8,612,487 B2 *  12/2013  Hui ......................... G06F 16/86
                                                            707/802
11,474,799 B2 *  10/2022  Cseri ................... G06F 16/2452
2019/0121847 A1 *  4/2019  Castañeda-Villagrán ...................
                                                            G06F 40/18
2022/0398186 A1 *  12/2022  Mudumba ............. G06F 16/254

OTHER PUBLICATIONS

H. Miller. Big Data Analysis with Scala and Spark [Online]. Coursera, offered by EPFL. [retrieved on Jul. 20, 2023]. Retrieved from the Internet < URL: https://www.coursera.org/learn/scala-spark-big-data >.
ETL (Extract, Transform, Load) [Online]. IBM. [retrieved on Jul. 20, 2023]. Retrieved from the Internet < URL: https:// www.ibm. com/cloud/learn/etl#toc-etl-vs-elt-goFgkQcP >.
JAR (file format) [Online]. In Wikipedia. [retrieved on Jul. 20, 2023]. Retrieved from the Internet < URL: https://en.wikipedia.org/ wiki/JAR_(file_format) >.

(Continued)

*Primary Examiner* — Ryan D. Coyer

(57)        ABSTRACT

Methods, systems, and techniques for performing automatic source code generation for use in a data transformation process. A computer obtains a data file comprising data transformation rules. Using those rules, the computer automatically generates computer source code for use in a data transformation process to transform source data into target data. The source data may, for example, be raw data from a data lake, and the computer source code may be Scala computer code for execution within an Apache Spark™ framework. The data lake may execute the computer source code to transform the raw data stored in the data lake into the target data, and the target data may then be stored in the data warehouse.

18 Claims, 16 Drawing Sheets

Transformation Framework

Mapping Document in Excel Spreadsheet → Type I 102a → Scala/Spark Source Code for Transformation Process SQL Script Files → Type II 102b → Scala/Spark Source Code for Transformation Process Semi- Structured Text Mapping Document → Manually Generate Transformation Configuration File → Type III 102c → Scala/Spark Source Code for Transformation Process

(56) References Cited

OTHER PUBLICATIONS

Blog entitled "Programming for beginners_ What is an edge node in Hadoop". Posted Mar. 3, 2022. Retrieved from the Internet < URL: https://self-learning-java-tutorial.blogspot.com/2022/03/what-is-edge-node-in-hadoop.html >.

Create Spark Project in Scala With Eclipse Without Maven [Online]. Data Flair. [retrieved on Jul. 20, 2023]. Retrieved from the Internet < URL: https://data-flair.training/blogs/create-spark-scala-project/ >.

* cited by examiner

| Data Element # | Source System | Business Table/File Name | Business Element Name | Element Defition | Technical File Name | Technical Table Name | Technical Column Name | Data Type | Data Length | Decimal Places | Valid Values |
|---|---|---|---|---|---|---|---|---|---|---|---|
| | | | | | | | | | | | |
| | Household | Fee Collection | Fee Collection Identifier | Unique Identifier of the Fee Collection | | FEE_CLCT | FEE_CLCT_ID | INTEGER | | | |
| | Household | Fee Collection | Household List Identifier | Unique Identifier of the Household | | FEE_CLCT | HSEHLD_LST_ID | INTEGER | | | |
| | Household | Fee Collection | Client Language | Client's language for the fee collection invoice | | FEE_CLCT | CLNT_LANG | CHAR(2) | 2 | | |
| | Household | Fee Collection | New Fee Date | Stores next date a work item needs to be generated for this fee collection | | FEE_CLCT | NXT_FEE_DT | DATETIME | | | |
| | Household | Fee Collection | Private Counsel Account # | The Private Counselor Account number of payment methods of type PH&N or Private Trust | | FEE_CLCT | PRVT_CNSL_ACCT_NO | VARCHAR(60) | 60 | | |
| | Household | Fee Collection | Effective Data | Effective date of the Fee Collection arrangement | | FEE_CLCT | EFF_DT | DATE | | | |
| | Household | Fee Collection | Fee End Date | Date when a fee collection arrangement is scheduled to end | | FEE_CLCT | FEE_END_DT | DATE | | | |
| | Household | Fee Collection | Approval Date | Approval Date of the fee collection arrangement | | FEE_CLCT | APROV_DT | DATE | | | |
| | Household | Fee Collection | Previous Fee Collection Id... | This field is to keep track of previous Fee Collection Identifier which the current Fee Collection Identifier is updated from | | FEE_CLCT | PREV_FEE_CLCT_ID | INTEGER | | | |

FIG. 8A

| PK | FK | Nulls [Y/N] | Physical Table Name | Physical Column Name | Target Data Type | Target Data Length | Target Decimal | Target PK | FK | Target Nulls [Y/N] | If Null Default... | Transformation/Derivation Rules |
|---|---|---|---|---|---|---|---|---|---|---|---|---|
| Y | N | N | PB_HH_FEE_CLCT_DLY | FEE_CLCT_ID | INTEGER | | | True | False | N | | Straight move |
| Y | Y | N | PB_HH_FEE_CLCT_DLY | HSEHLD_LST_ID | INTEGER | | | True | True | N | | Straight move |
| N | N | Y | PB_HH_FEE_CLCT_DLY | CLNT_LANG | CHAR(2) | 2 | | False | False | Y | | Straight move, if source is blank or null set to null |
| N | N | Y | PB_HH_FEE_CLCT_DLY | NXT_FEE_DT | DATETIME | | | False | False | Y | | Straight move, if source is null or blank set to 1999-12-31 |
| N | N | Y | PB_HH_FEE_CLCT_DLY | PRVT_CNSL_ACCT_NO | VARCHAR(60) | 60 | | False | False | Y | | Straight move, if source is null or blank set to null |
| N | N | Y | PB_HH_FEE_CLCT_DLY | EFF_DT | DATE | | | False | False | Y | | Straight move, if source is null or blank set to null |
| N | N | Y | PB_HH_FEE_CLCT_DLY | FEE_END_DT | DATE | | | False | False | Y | | Move date portion of source field, if source is blank or null or invalid date set to null |
| N | N | Y | PB_HH_FEE_CLCT_DLY | APROV_DT | DATE | | | False | False | Y | | Move date portion of source field, if source is blank or null or invalid date set to null |
| N | N | Y | PB_HH_FEE_CLCT_DLY | PREV_FEE_CLCT_ID | INTEGER | | | False | | Y | | Set to 161 |

FIG. 8B

| FEE_CLCT_ID | HSEHLD_LST_ID | ACCT_NO | PYMT_MTHD_ID | PYMT_AMD | PYMT_FREQ | FEE_STRT_DT | ACCT_RT | IC_TR |
|---|---|---|---|---|---|---|---|---|
| 1 | 33891 | | 6 | 650 | 2 | 2011-09-01T00:00:00.000-04:00 | | 3417 |
| 1 | 50916 | | 6 | 650 | 2 | 2011-09-01T00:00:00.000-04:00 | | 3417 |
| 2 | 49830 | | 6 | 375 | 2 | 2010-02-01T00:00:00.000-05:00 | | 3697 |
| 3 | 48665 | | 6 | 375 | 2 | 2009-11-01T00:00:00.000-04:00 | | 4214 |
| 4 | 49653 | | 6 | 375 | 2 | 2009-11-01T00:00:00.000-04:00 | | 4214 |
| 5 | 22446 | | 6 | 375 | 2 | 2011-09-01T00:00:00.000-04:00 | | 3367 |
| 5 | 38831 | | 6 | 375 | 2 | 2011-09-01T00:00:00.000-04:00 | | 3367 |
| 6 | 25193 | | 6 | 375 | 2 | 2011-09-01T00:00:00.000-04:00 | | 3417 |
| 6 | 41745 | | 6 | 375 | 2 | 2011-09-01T00:00:00.000-04:00 | | 3417 |
| 7 | 26054 | | 6 | 375 | 2 | 2011-09-01T00:00:00.000-04:00 | | 3417 |
| 7 | 42627 | | 6 | 375 | 2 | 2008-01-01T00:00:00.000-05:00 | | 3417 |
| 8 | 27581 | | 6 | 375 | 2 | 2008-01-01T00:00:00.000-05:00 | | 3367 |
| 8 | 44229 | | 6 | 375 | 2 | 2011-09-01T00:00:00.000-04:00 | | 3367 |
| 9 | 25135 | | 6 | 375 | 2 | 2011-09-01T00:00:00.000-04:00 | | 3417 |
| 9 | 41719 | | 6 | 375 | 2 | 2011-09-01T00:00:00.000-04:00 | | 3417 |
| 10 | 25117 | | 6 | 375 | 2 | 2011-09-01T00:00:00.000-04:00 | | 3417 |
| 10 | 41701 | | 6 | 375 | 2 | 2011-09-01T00:00:00.000-04:00 | | 3417 |
| 11 | 25114 | | 6 | 900 | 2 | 2012-09-01T00:00:00.000-04:00 | | 3417 |
| 11 | 41698 | | 6 | 900 | 2 | 2012-09-01T00:00:00.000-04:00 | | 3417 |
| 12 | 25150 | | 6 | 900 | 2 | 2011-09-01T00:00:00.000-04:00 | | 3417 |
| 12 | 41729 | | 6 | 900 | 2 | 2011-09-01T00:00:00.000-04:00 | | 3417 |
| 13 | 25235 | | 6 | 900 | 2 | 2011-09-01T00:00:00.000-04:00 | | 3417 |
| 13 | 41766 | | 6 | 900 | 2 | 2011-09-01T00:00:00.000-04:00 | | 3417 |
| 14 | 23683 | | 6 | 375 | 2 | 2011-09-01T00:00:00.000-04:00 | | 3367 |
| 14 | 40162 | | 6 | 375 | 2 | 2011-09-01T00:00:00.000-04:00 | | 3367 |

FIG. 8C

```
demo.sql
1
2    ---- MARKET/SEGMENT staging tables
3    insert into ddwv01.student_score
4    select s.StudentId, s.StudentName, c.CourseId, c.score
5           from ddwv01.student s, ddwv01.score c
6    on s.StudentId= c.StudentId;
7
8    insert into ddwv01.student_score_course_grade
9    select s.*, c.CourseName
10          from ddwv01.student_score s, ddwv01.course c
11   on s.CourseId= c.CourseId;
12
13
14
15
```

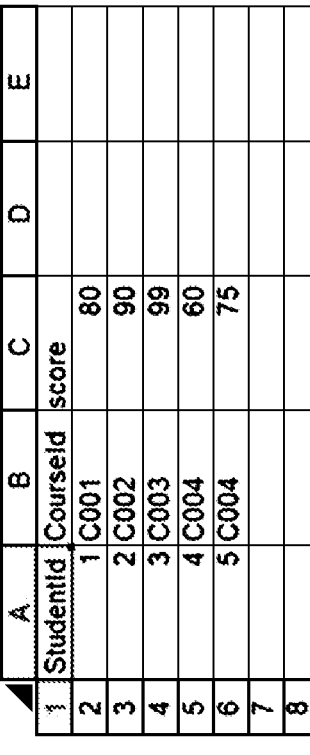
|   | A | B | C | D | E |
|---|---|---|---|---|---|
| 1 | StudentId | CourseId | score | | |
| 2 | 1 | C001 | 80 | | |
| 3 | 2 | C002 | 90 | | |
| 4 | 3 | C003 | 99 | | |
| 5 | 4 | C004 | 60 | | |
| 6 | 5 | C004 | 75 | | |
| 7 | | | | | |
| 8 | | | | | |
FIG. 9C
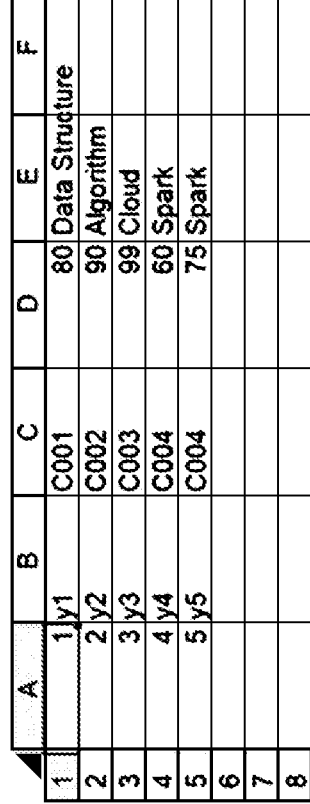
|   | A | B | C | D | E | F |
|---|---|---|---|---|---|---|
| 1 | 1 | y1 | C001 | 80 | Data Structure | |
| 2 | 2 | y2 | C002 | 90 | Algorithm | |
| 3 | 3 | y3 | C003 | 99 | Cloud | |
| 4 | 4 | y4 | C004 | 60 | Spark | |
| 5 | 5 | y5 | C004 | 75 | Spark | |
| 6 | | | | | | |
| 7 | | | | | | |
| 8 | | | | | | |
FIG. 9E
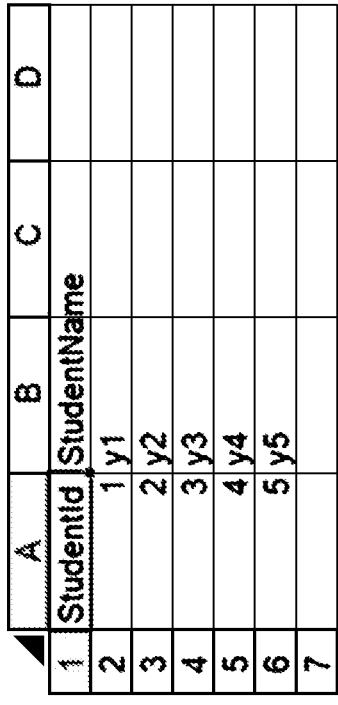
|   | A | B | C | D |
|---|---|---|---|---|
| 1 | StudentId | StudentName | | |
| 2 | 1 | y1 | | |
| 3 | 2 | y2 | | |
| 4 | 3 | y3 | | |
| 5 | 4 | y4 | | |
| 6 | 5 | y5 | | |
| 7 | | | | |
FIG. 9B
|   | A | B | C | D |
|---|---|---|---|---|
| 1 | CourseId | CourseName | | |
| 2 | C001 | Data Structure | | |
| 3 | C002 | Algorithm | | |
| 4 | C003 | Cloud | | |
| 5 | C004 | Spark | | |
| 6 | | | | |
| 7 | | | | |
FIG. 9D

| Bank | AAA | BBB | CCC | DDD | EEE | FFF | GGG | National | Other Bank | Total Chart | Big N subtotal |
|---|---|---|---|---|---|---|---|---|---|---|---|
| 13-Mar | 82887992 | | | 43845943 | 50184535 | 35902286 | 54505816 | 19021809 | 34254436 | 3.21E+08 | 267326572 |
| 08-Dec | 58296367 | | | 26785726 | 28666116 | 27239968 | 38375009 | 13545799 | 27603078 | 2.21E+08 | 179363186 |
| 10-Jul | 62395702 | | | 29321866 | 36036747 | 32333235 | 43664931 | 14944718 | 33349243 | 2.52E+08 | 203752481 |
| 07-Jan | 44992592 | | | 22348862 | 23713584 | 23958161 | 31666691 | 11735996 | 20324113 | 1.79E+08 | 146679890 |
| 17-Aug | 1.24E+08 | 1.16E+08 | 8244316 | 57202304 | 68904622 | 54795401 | 89428883 | 34018455 | 48156783 | 4.77E+08 | 394784892 |
| 19-Jul | 1.37E+08 | 1.33E+08 | 4103489 | 65365958 | 79872055 | 62034426 | 97218151 | 41806502 | 52299601 | 5.35E+08 | 441165644 |
| 13-Jan | 81952633 | | | 43665184 | 48545097 | 36170746 | 54526557 | 17613339 | 34611946 | 3.17E+08 | 264860217 |

FIG. 10A

| Bank | Date | Trend | Forecast | Seasonality | Spot Bal | Pct Share | Pct Share | Spot Excl | Spot Excl | Pct Share | Pct Share | Forecast |
|---|---|---|---|---|---|---|---|---|---|---|---|---|
| AAA | 31/01/2007 | -3.6E+10 | 4.5E+10 | 1.41E+11 | 4.5E+10 | 0.251721 | | 1.34E+11 | 1.02E+11 | 0.748279 | | 4.5E+10 |
| AAA | 31/12/2008 | -7.9E+10 | 5.83E+10 | 1.37E+11 | 5.83E+10 | 0.264368 | | 1.62E+11 | 1.21E+11 | 0.735632 | | 0 |
| AAA | 31/07/2010 | -6.5E+10 | 6.24E+10 | 1.27E+11 | 6.24E+10 | 0.247556 | | 1.9E+11 | 1.41E+11 | 0.752444 | | 6.24E+10 |
| AAA | 31/01/2013 | -4.2E+10 | 8.2E+10 | 1.24E+11 | 8.2E+10 | 0.258456 | | 2.35E+11 | 1.83E+11 | 0.741544 | | 8.2E+10 |
| AAA | 31/03/2013 | -4.1E+10 | 8.29E+10 | 1.24E+11 | 8.29E+10 | 0.258538 | | 2.38E+11 | 1.84E+11 | 0.741462 | | 0 |
| AAA | 31/08/2017 | -7.9E+08 | 1.24E+11 | 1.25E+11 | 1.24E+11 | 0.260931 | | 3.53E+11 | 2.7E+11 | 0.739069 | | 0 |
| AAA | 31/07/2019 | 1.65E+10 | 1.37E+11 | 1.2E+11 | 1.37E+11 | 0.255338 | | 3.99E+11 | 3.04E+11 | 0.744662 | | 1.37E+11 |
| AAA | 31/08/2019 | 1.73E+10 | 1.54E+11 | 1.37E+11 | | | | | | | | 0 |
| AAA | 30/09/2019 | 1.81E+10 | 8.43E+10 | 6.62E+10 | | | | | | | | 0 |
| AAA | 31/10/2019 | 1.88E+10 | 3.88E+11 | 3.69E+11 | | | | | | | | 3.88E+11 |
| AAA | 30/11/2019 | 1.96E+10 | -7.8E+10 | -8E+11 | | | | | | | | 0 |
| AAA | 31/12/2019 | 2.03E+10 | 1.26E+11 | 1.06E+11 | | | | | | | | 0 |
| AAA | 31/01/2020 | 2.11E+10 | 1.71E+11 | 1.5E+11 | | | | | | | | 1.71E+11 |
| AAA | 29/02/2020 | 2.18E+10 | -3.7E+11 | -4E+11 | | | | | | | | 0 |
| AAA | 31/03/2020 | 2.26E+10 | 1.48E+11 | 1.26E+11 | | | | | | | | 0 |
| AAA | 30/04/2020 | 2.33E+10 | 2.45E+11 | 2.22E+11 | | | | | | | | 2.45E+11 |
| AAA | 31/05/2020 | 2.41E+10 | 3.1E+11 | 2.86E+11 | | | | | | | | 0 |
| AAA | 30/06/2020 | 2.48E+10 | -4.1E+11 | -4.4E+11 | | | | | | | | 0 |
| AAA | 31/07/2020 | 2.56E+10 | 1.67E+11 | 1.42E+11 | | | | | | | | 1.67E+11 |
| BBB | 31/01/2007 | -2.3E+12 | -9.4E+11 | 1.34E+12 | | | | | | | | -9.4E+11 |
| BBB | 31/12/2008 | -1.8E+12 | -1.4E+12 | 4E+11 | | | | | | | | 0 |
| BBB | 31/07/2010 | -1.5E+12 | -1.9E+12 | -4E+11 | | | | | | | | -1.9E+12 |
| BBB | 31/01/2013 | -9.3E+11 | 3.91E+11 | 1.32E+12 | | | | | | | | 3.91E+11 |
| BBB | 31/03/2013 | -9E+11 | -1.3E+12 | -4.3E+12 | | | | | | | | 0 |
| BBB | 31/08/2017 | 9.3E+10 | 1.16E+11 | 2.32E+10 | 1.16E+11 | 0.243646 | | 3.61E+11 | 2.79E+11 | 0.756354 | | 0 |
| BBB | 31/07/2019 | 5.21E+11 | 1.33E+11 | -3.9E+11 | 1.33E+11 | 0.247672 | | 4.03E+11 | 3.09E+11 | 0.752328 | | 1.33E+11 |
| BBB | 31/08/2019 | 5.4E+11 | 5.54E+11 | 1.4E+10 | | | | | | | | 0 |
| BBB | 30/09/2019 | 5.58E+11 | -1.3E+12 | -1.9E+12 | | | | | | | | 0 |
| BBB | 31/10/2019 | 5.77E+11 | -1E+12 | -1.6E+12 | | | | | | | | -1E+12 |
| BBB | 30/11/2019 | 5.96E+11 | 2.04E+12 | 1.44E+12 | | | | | | | | 0 |
| BBB | 31/12/2019 | 6.15E+11 | 1.01E+12 | 3.95E+11 | | | | | | | | 0 |

METHOD AND SYSTEM FOR PERFORMING AUTOMATIC SOURCE CODE GENERATION FOR USE IN A DATA TRANSFORMATION PROCESS

CROSS-REFERENCE TO RELATED APPLICATION

This application claims priority to U.S. provisional patent application No. 63/391,634, filed on Jul. 22, 2022, and entitled "Method and System for Performing Automatic Source Code Generation for Use in a Data Transformation Process," the entirety of which is hereby incorporated by reference herein.

TECHNICAL HELD

The present disclosure is directed at methods, systems, and techniques for performing automatic source code generation for use in a data transformation process and, more particularly, a data transformation process executed on a data lake to transform data stored in the data lake.

BACKGROUND

Data transformation refers to converting data from one format into another format. For example, data may be stored in a "raw" or unstructured format in a data lake, and it may be desirable to transform that raw data into a more structured format prior to exporting it to a data warehouse for further processing. Given the large amounts of data typically handled in such transformations and the multitude of different formats that may be involved in transformation, it is technically challenging to find a computer-implemented data transformation solution that is generally applicable to different types of data.

SUMMARY

According to a first aspect, there is provided a method comprising: obtaining a data file comprising data transformation rules; automatically generating, using the data transformation rules, computer source code for use in a data transformation process to transform source data into target data; and storing the computer source code.

The computer source code may comprise Scala Spark code.

The data file may comprise a mapping document in the form of a spreadsheet.

The data file may comprise a mapping document in the form of an SQL script.

The data file may comprise a transformation configuration file generated from a semi-structured text mapping document.

The method may further comprise: obtaining the source data for transformation from a data source; and executing the computer source code to transform the source data into the target data.

The source data may comprise raw data obtained from a data lake.

The source data may be obtained from a Hadoop data cluster.

The method may further comprise storing the target data in a data warehouse.

The target data may comprise delimited files.

The source data may be Parquet or Avro formatted.

The method of any one of claims 1 to 11, wherein the computer source code comprises JAR files.

The method of claim 3, wherein the spreadsheet specifies a source table and a source column of the source table specifying a location of the source data, and a target table and a target column of the target table specifying a location of the target data.

According to another aspect, there is provided a system comprising: a data lake storing raw source data; a data warehouse; a client machine comprising a processor and a non-transitory computer readable medium, the non-transitory computer readable medium having stored thereon computer program code that is executable by the processor and that, when executed by the processor, causes the processor to perform a method comprising: obtaining a data file comprising data transformation rules; automatically generating, using the data transformation rules, computer source code for use in a data transformation process to transform the source data into target data; obtaining the raw source from the data lake; executing the computer source code to transform the source data into the target data; and storing the target data in the data warehouse.

According to another aspect, there is provided an automatic computer source code generation method, the method comprising: obtaining a data file comprising data transformation rules; automatically generating, using the data transformation rules, the computer source code for use in a data transformation process to transform source data into target data; and storing the computer source code, wherein the computer source code comprises code Scala computer code for execution within an Apache Spark™ framework.

The data file may comprise a mapping document in the form of a spreadsheet.

The spreadsheet may specify a source table and a source column of the source table specifying a location of the source data, and a target table and a target column of the target table specifying a location of the target data.

The data file may comprise a mapping document in the form of an SQL script.

The data file may comprise a transformation configuration file generated from a semi-structured text mapping document.

The computer source code may comprise JAR files.

The method may further comprise: obtaining from a data lake the source data for transformation from a data source, wherein the source data comprises raw data stored in the data lake; and executing the computer source code on the data lake to transform the source data into the target data.

The source data may be obtained from a Hadoop data cluster.

The method may further comprise storing the target data in a data warehouse.

The source data may be Parquet or Avro formatted.

The data lake and an edge node may be communicatively coupled as part of a network, and the computer source code may be generated on the edge node.

The data transformation rules may be expressed in natural language, and automatically generating the computer source code may comprise: identifying language in the data transformation rules corresponding to computer source code commands; and including the computer source code commands corresponding to the identified language in the computer source code.

The identifying may be done by applying a regular expression to the data transformation rules.

According to another aspect, there is provided a system comprising: at least one processor; and at least one non-transitory computer readable medium, the at least one non-transitory computer readable medium having stored thereon computer program code that is executable by the at least one processor and that, when executed by the at least one processor, causes the at least one processor to perform an automatic computer source code generation method comprising: obtaining a data file comprising data transformation rules; automatically generating, using the data transformation rules, the computer source code for use in a data transformation process to transform source data into target data; and storing the computer source code, wherein the computer source code comprises code Scala computer code for execution within an Apache Spark™ framework.

The data file may comprise a mapping document in the form of a spreadsheet.

The data file may comprise a mapping document in the form of an SQL script.

The data file may comprise a transformation configuration file generated from a semi-structured text mapping document.

The at least one processor and the at least one non-transitory computer readable medium may comprise part of an edge node; the system may further comprise a data lake communicatively coupled to the edge node; and the computer source code may be executed on the data lake to transform raw data stored in the data lake.

The data transformation rules may be expressed in natural language, and automatically generating the computer source code may comprise: identifying language in the data transformation rules corresponding to computer source code commands; and including the computer source code commands corresponding to the identified language in the computer source code.

According to another aspect, there is provided a non-transitory computer readable medium having stored thereon computer program code that is executable by a processor and that, when executed by the processor, causes the processor to perform any of the foregoing methods or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 8A-8D are excerpts of a mapping document (FIGS. 8A and 8B), a source file in Parquet format for data transformation (FIG. 8C), and a transformed file generated from the source file in accordance with the mapping document (FIG. 8D), according to an example embodiment using the system of FIG. 5.

FIGS. 9A-9E are a mapping document in the form of an SQL script file (FIG. 9A), various source files in Parquet format for data transformation (FIGS. 9B-9D), and a transformed file generated from the source files in accordance with the mapping document (FIG. 9E), according to an example embodiment using the system of FIG. 6.

FIGS. 10A and 10B are example source and target tables demonstrating a transformation of the data in the source table.

DETAILED DESCRIPTION

Data transformation may be done, for example, when data is being exported from a data lake to a data warehouse. In the data lake, the data may be stored in an unstructured or "raw" format that is not well suited for subsequent processing, such as in data analytics. Consequently, the data is transformed from its raw format into a more structured format better suited for subsequent processing and is stored in that more structured format in the data lake and/or in a data warehouse.

This transformation may be done using third party transformation tools such as IBM's DataStage™ tool. However, such tools typically lack flexibility to handle a wide variety of different data formats. Consequently, a more flexible solution that is able to handle a wide variety of source and target data formats and that is automated to facilitate handling of large amounts of data is desirable.

The embodiments described herein are directed at various methods, systems, and techniques for performing automatic source code generation for use in a data transformation process. That source code may be, for example, Scala Spark computer code (i.e., Scala code to be executed within an Apache Spark™ framework to perform the data transformation). An example of Scala Spark computer code is computer code used to implement an Apache Spark™ project in the Scala programming language. This source code can then be applied to transform data that has been extracted from one data store in one format (e.g., raw data extracted from a data lake) into another format for loading into another data store (e.g., structured data for storage in a data warehouse). Relying on automatically generated source code in this fashion for data transformation facilitates efficiency, productivity, reproducibility, consistency of quality, and maintainability.

Figure 1:
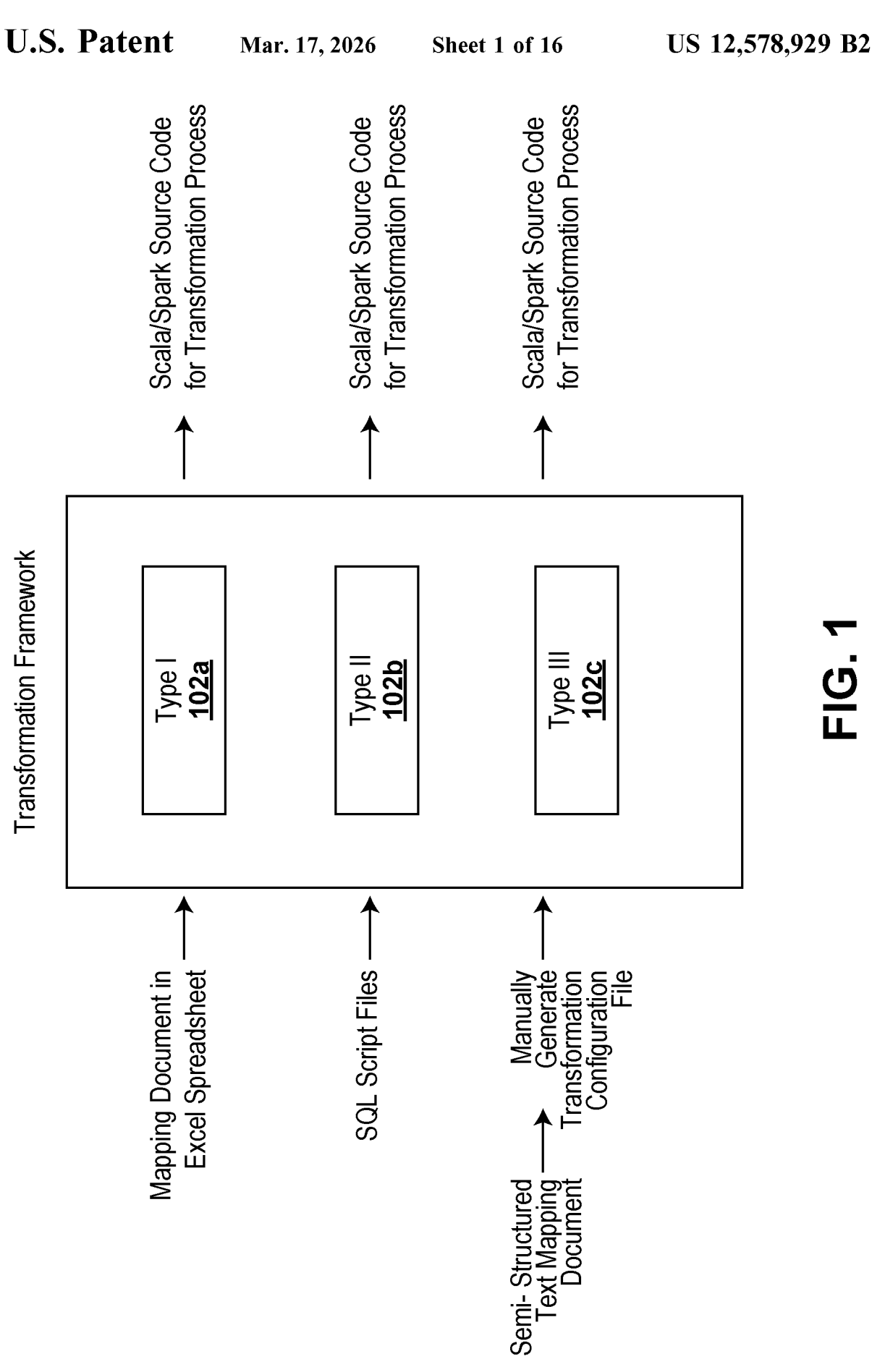
FIG. 1 is a block diagram depicting different example transformation framework types.

Referring now to FIG. 1, there are shown three transformation frameworks 102a-c: a type 1 transformation framework 102a that receives a mapping document comprising data transformation rules in the form of a spreadsheet, such as a Microsoft Excel™ spreadsheet, as input and that automatically outputs Scala Spark computer code for use in a data transformation process as output; a type 2 transformation framework 102b that receives one or more SQL script files as input for use as a mapping document comprising data transformation rules and that automatically outputs Scala Spark computer code for use in a data transformation process as output; and a type 3 transformation framework 102c that receives a mapping document in the form of a transformation configuration file manually generated from a semi-structured text mapping document as input and that automatically outputs Scala Spark computer code for use in a data transformation process as output. The Scala Spark computer code output by any of the transformation frameworks 102a-c may be used to perform data transformation as described in respect of FIGS. 5-7 below. The type 1 through type 3 transformation frameworks 102a-c are described in turn, below, in connection with FIGS. 2-4.

Type 1 Transformation Framework

Figure 2:
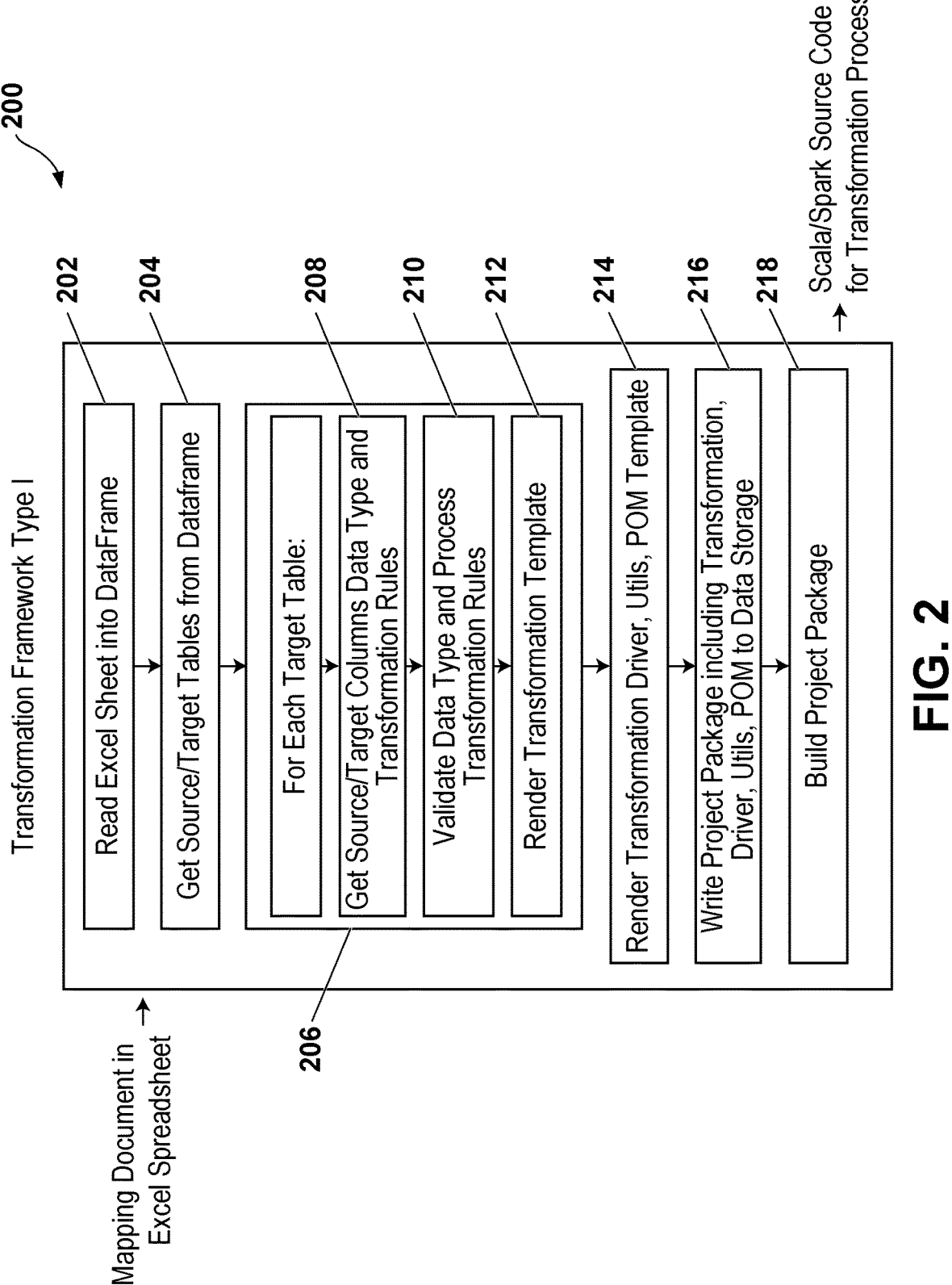
FIGS. 2-4 are flowcharts respectively depicting example methods for performing automatic source code generation for use in a data transformation process.

Referring now to FIG. 2, there is shown an example method 200 for performing automatic source code generation for use in a data transformation process. More particularly, the method 200 of FIG. 2 is used to implement the type 1 transformation framework 102a. The method 200 may be expressed as processor-executable computer program code and be stored on a non-transitory computer readable medium for execution by a processor. When executed by the processor, the computer program code causes the processor to perform the method 200.

The method 200 commences at block 202 where the processor receives as input a document comprising data transformation rules written in natural language. In this embodiment, the mapping document comprises a spreadsheet, such as a Microsoft Excel™ spreadsheet. The processor reads the spreadsheet into the Spark DataFrame. Following entry into the Spark DataFrame, the processor at block 204 filters the DataFrame to obtain source and target tables from the spreadsheet. For example, the processor may extract source table names from one column of the spreadsheet and target table names from another column of the spreadsheet by executing computer code such as the following:

```
val  excelDF=Utils.readMappingExcel(spark,  filename,
    "Mapping", false)
val tgtTables=excelDF.select("targetTable").distinct( )fil-
    ter(col("targetTable")isNotNull).collectAsList( )
val    srcTables=excelDF.select("sourceTable").distinct(
    )filter(col("sourceTable")isNotNull).collectAsList( )
```

After obtaining the target tables, the processor at block 206 renders a transformation template for each of the target tables. More particularly, in rendering this template, for each of the target tables the processor does the following:

1. The processor determines from the DataFrame the data type of the source and target columns, and the data transformation rules (block 208). Determining the data transformation rules may be performed using data retrieval, such as by executing the following source code: String transformationRuleCols=Utils.getMappingTableValue(mappingExcelDf, tgtTable, "transformationRules", "#").

2. The processor processes the data transformation rules to generate transformation and data type validation computer code in String (block 210). This rules may be parsed using a regular expression and then the expression may be translated into a Scala Spark code snippet.

3. The processor renders a transformation template (block 212). An example transformation template is appended to the end of this disclosure as "Code Example 1".

Following block 212, the processor renders a transformation driver, utility functions, and Project Object Model ("POM") templates at block 214 using the transformation templates generated for each of the target tables. More particularly, the processor may call org.stringtemplate.v4.STGroupFile.getInstanceOf( ).render and pass parameters to permit the transformation templates to render the transformation driver, utility functions, and POM templates.

Once rendered, the processor at block 216 writes a complete project package comprising the transformation driver, utility functions, and POM templates into storage. An example transformation driver template is appended to the end of this disclosure as "Code Example 2".

An example utility function template is appended to the end of this disclosure as "Code Example 3".

From the project package, the processor builds the project package at block 218 using, for example, the Apache Maven™ build automation tool. The output of the method 200 is source code for use in a data transformation process; example source code in FIG. 2 is Scala Spark source code. The output of block 218 may also include JAR files as discussed below in respect of FIG. 5.

Figure 5:
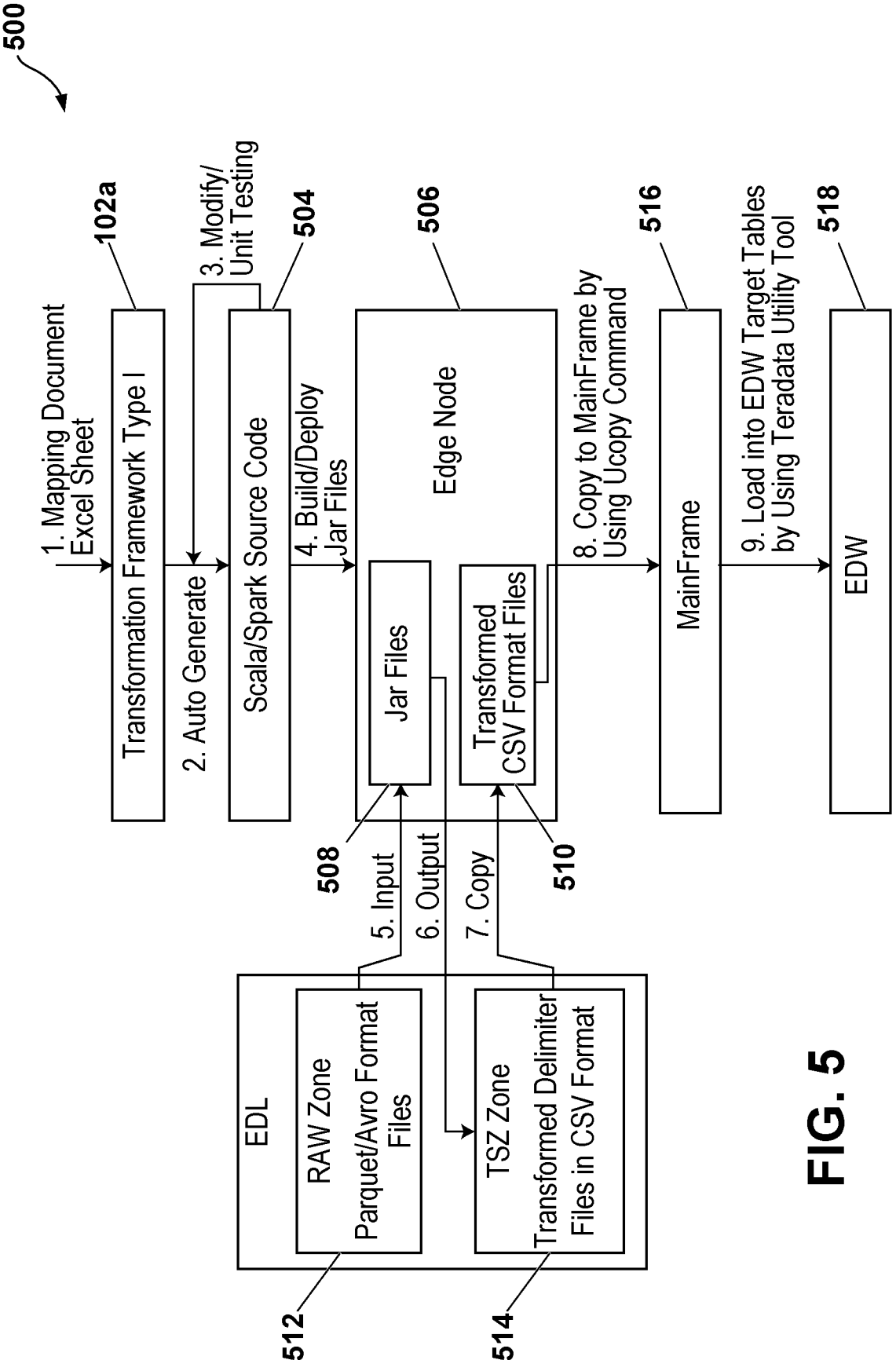
FIGS. 5-7 are block diagrams depicting systems for performing example data transformation using the source code automatically generated from the methods of FIGS. 2-4, respectively.

Referring now to FIG. 5, there is shown an example system 500 for performing data transformation using the source code automatically generated from the method 200 of FIG. 2.

In the system 500 of FIG. 5, the type 1 transformation framework 102a receives as input the document comprising data transformation rules written in natural language, and from it automatically generates Scala Spark source code 504. The type 1 transformation framework 102a accordingly performs the method 200 of FIG. 2 as described above. As shown in FIG. 5, unit testing may be performed on the Scala Spark source code, and the source code may also be modified if so desired.

Once the final Scala Spark source code 504 is obtained, a processor builds the project and deploys the resulting JAR files 508 to an edge node 506 that is part of one or more Hadoop clusters from, for example, a developer's client machine on which the build is performed. The edge node 506 receives from a raw zone 512 comprising part of an Enterprise Data Lake ("EDL"), which itself comprises the one or more Hadoop clusters, files in Parquet or Avro format, and uses those Parquet/Avro files as input for the JAR files 508. The JAR files contain functions to load the Parquet/Avro files and perform the data transformation. The JAR files 508 accordingly perform the data transformation on the Parquet/Avro files and output transformed files 510 in CSV format ("CSV files 510") to a technical standardized zone of the EDL ("TSZ zone 514"). The CSV files 510 are then copied from the TSZ zone 514 to the edge node 506, and then from the edge node to a mainframe 516 by using the mainframe's 516 ucopy command. From the mainframe 516, the copied files are loaded into target tables of an enterprise data warehouse 518 ("EDW 518") using, for example, Teradata™ utilities. Additionally or alternatively, the transformed files may be stored on the EDL. While the transformed files are in CSV format in this example, they may in different embodiments be in a different suitable format.

Generally speaking for all the transformation frameworks 102a-c, the transformed files are tabular regardless of their format. The raw data to be transformed, which is retrieved from the EDL's raw zone, may or may not be tabular. For example, the raw data may be Apache Avro™ data that uses an XML hierarchy format for records.

When compared in experiments against manual code generation, the type 1 transformation framework 102a results in efficiency gains of 5-10×. Additionally, automatically generated code is consistent across projects and does not vary with individuals as can occur with manually generated code. This can be beneficial when maintaining a code base.

Referring now to FIGS. 8A-8D, there are shown excerpts from a mapping document (FIGS. 8A and 8B), a source file in Parquet format for data transformation (FIG. 8C), and a transformed file generated from the source file in accordance with the mapping document (FIG. 8D), respectively, according to an example embodiment using the system 500 of FIG. 5.

More particularly, FIGS. 8A and 8B depict an example mapping document in the form of a Microsoft Excel™ spreadsheet. The mapping document specifies the location of the source data for transformation by specifying the source table in which data is found (in FIG. 8A, the source tables are in the "TECHNICAL TABLE NAME" column); the particular column in the source tables in which the data to be transformed is present ("source column") (in FIG. 8A, the source columns are in the "TECHNICAL COLUMN NAME" column); the location of the target table to which transformed data is to be written (in FIG. 8B, the target tables are in the "PHYSICAL TABLE NAME" column); the particular column in the target tables to which transformed data is to be written ("target column") (in FIG. 8B, the target columns are in the "PHYSICAL COLUMN NAME" column; and the data transformation rules in natural language format (in FIG. 8B, they are located in the "TRANSFOR-MATION/DERIVATION RULES" column). As described above in respect of the type 1 transformation framework 102*a*, the processor parses the natural language transformation rules into processor-executable actions by using matching textual phrases in the transformation rules to corresponding Scala Spark computer code. The processor may use regular expressions to identify transformation rules that map to executable computer commands. For example, FIG. 8A shows that in a source table named "FEE_CLCT" there is a source column named "NXT_FEE_DT", which contains data for transformation and storage into a target column named "NXT_FEE_DT" that is part of a target table named "PB_HH_FEE_CLCT_DLY", both of which are specified in FIG. 8B. The transformation rule in natural language applied to transform that data is "straight move, if source is null or blank set to 1999-12-31". This results in Scala Spark code as follows:

```
.withColumn("NXT_FEE_DT",   when(isNullOrBlank
  (col("NXT_FEE_DT")),lit("1999-12-31")).otherwise
  (col("NXT_FEE_DT")))
```

Figure 8D:
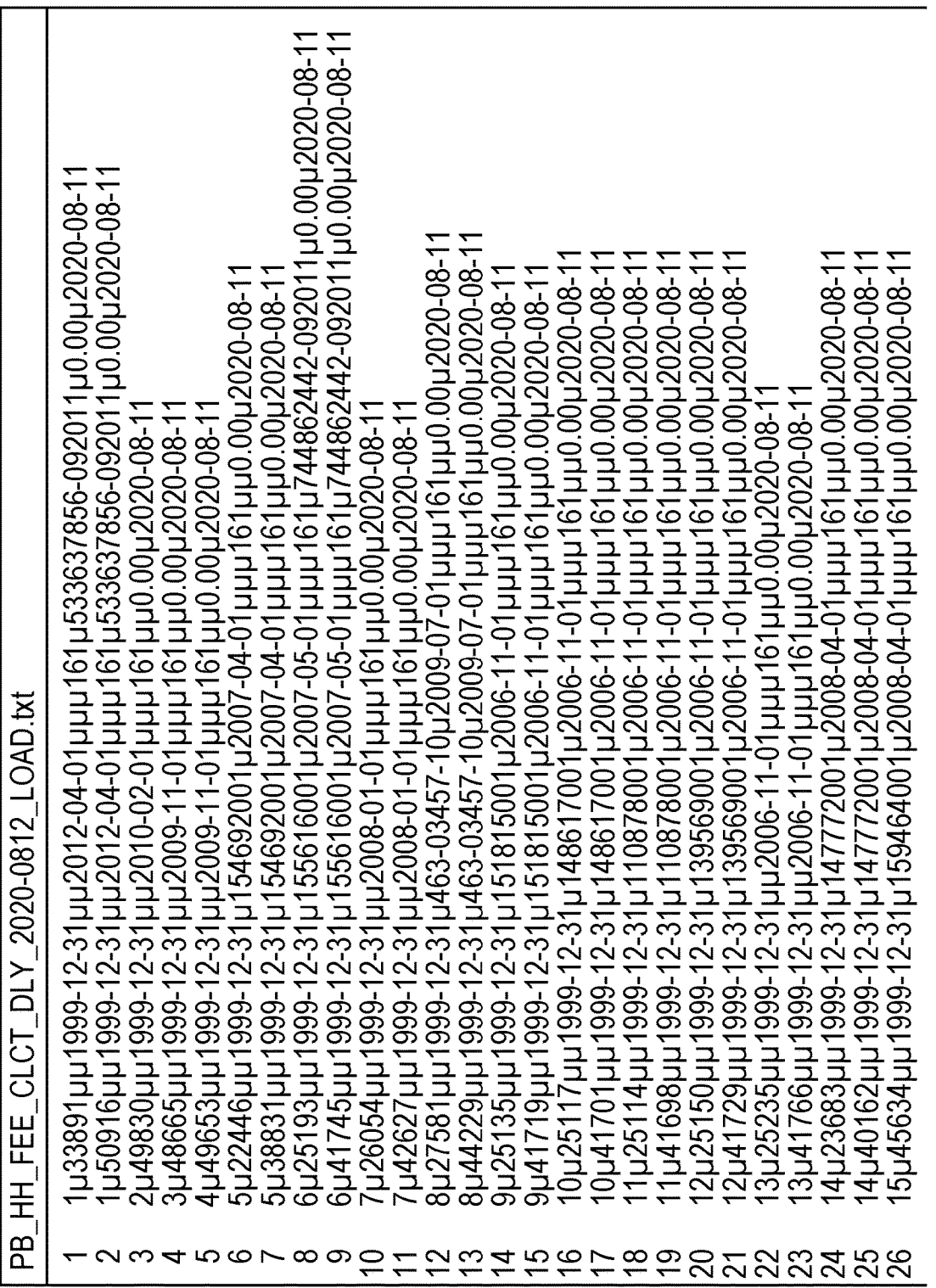

FIG. 8C depicts an example Parquet file converted to CSV format that the edge node 506 obtains from the EDL raw zone 512. The top row in FIG. 8C lists source columns of which at least some correspond to the source columns listed in the spreadsheet of FIG. 8A. An excerpt from the resulting transformed file generated by transforming the file of FIG. 8C in accordance with the data transformation rules of the mapping document is shown in FIG. 8D

Another example of an example spreadsheet mapping document is in Table 1, below.

TABLE 1

| | | | | | |
|---|---|---|---|---|---|
| Example Spreadsheet Mapping Document | | | | | |
| Source Table | Source Column | Target Table | Target Column | Transformation Rules | Comments |
| Student | Score | Student_Info | Grade | If value >80 then A else B | Value means source column Score |
| Student | Age | Student_Info | Class | If value >10 then "Senior" else "Junior" | Value means source column Age |

In Table 1, the mapping document specifies the source table, source column, target table, target column, and transformation rules as noted in the first row of Table 1. In Table 1, raw data in a source table named "Student" comprises a listing of student scores in a source column named "Score" and a listing of student ages in a source column named "Age". This data is respectively transformed and stored in a target table named "Student Info". A processor applies the transformation rules in Table 1 to transform the scores into A or B letter grades and to store the letter grades into a target column named "Grade" in the target table, and to transform student ages into whether the student is a "senior" or "junior" and to store the result into a target column named "Class" in the target table.

Another example of a spreadsheet mapping document is in Table 2, below. The mapping document of Table 2 is a simplified version of the type of spreadsheet shown in FIGS. 8A and 8B. Source and target tables in this example are excluded.

TABLE 2

| | | |
|---|---|---|
| Example Spreadsheet Mapping Document | | |
| Source Column | Target Column | Transformation Rules |
| FEE_CLCT_ID | FEE_CLCT_ID | straight move |
| HSEHLD_LST_ID | HSEHLD_LST_ID | straight move |
| CLNT_LANG | CLNT_LANG_CD | straight move - if source is blank or null set to null |
| NXT_FEE_DT | NXT_FEE_DT | straight move, if source is null or blank set to 1999-12-31 |
| PRVT_CNSL_ACCT_NO | PRVT_CNSL_ACCT_NO | straight move, if source is null or blank set to null |
| EFF_DT | EFF_DT | straight move, if source is null or blank set to null |
| FEE_END_DT | FEE_END_DT | move date portion of source field, if source is blank or null or invalid date set to null |
| APROV_DT | APROV_DT | move date portion of source field, if source is blank or null or invalid date set to null |

TABLE 2-continued

Example Spreadsheet Mapping Document

| Source Column | Target Column | Transformation Rules |
|---|---|---|
| PREV_FEE_CLCT_ID | PREV_FEE_CLCT_ID | set to 161 |
| INVOICE_ID | INV_ID | straight move, if source is null or blank set to null |
| APLCBL_VALUED_CLNT_REBT_AMT | APLCBL_VALUED_CLNT_REBT_AMT | straight move, if source is null or blank set to null |
| _BUSINESS_DT | CAPTR_DT | straight move |

Table 2 depicts example transformation rules. Other types of transformation rules comprise joining two different data sources, merging two different sources, and conditionally selecting data.

Using Table 2, the transformation and data type validation computer code generated at block 210 is appended to the end of this disclosure as "Code Example 4". While not specified in Table 2, the target table as represented in the computer code is named "PB_HH_FEE_CLCT_DLY". This may be specified outside of the mapping document.

And the Scala Spark code that results from applying the transformation template in this example is appended to the end of this disclosure as "Code Example 5".

Type 2 Transformation Framework

Figure 3:
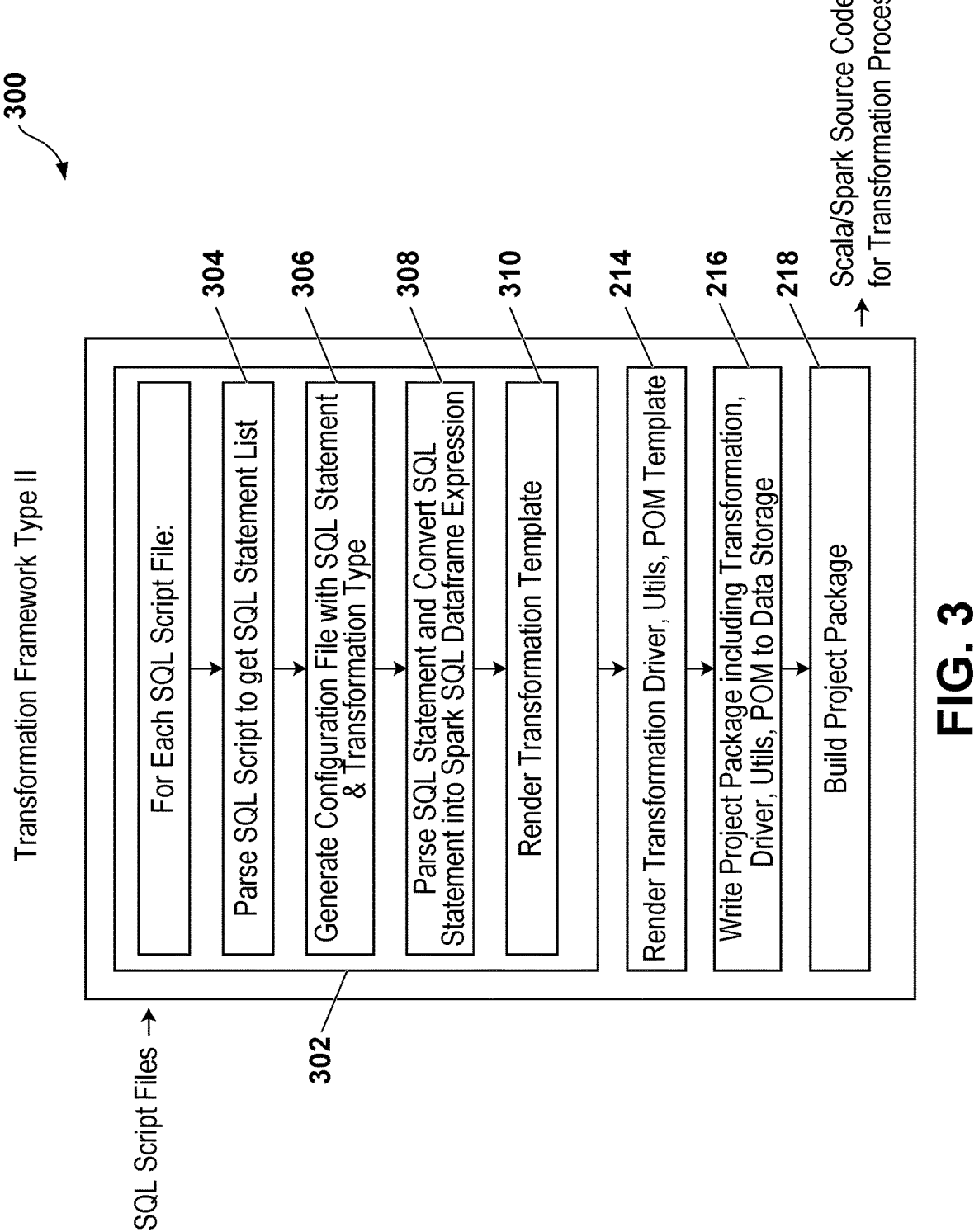

Referring now to FIG. 3, there is shown an example method 300 for performing automatic source code generation for use in a data transformation process. More particularly, the method 300 is used to implement the type 2 transformation framework 102*b*. The method 300 may be expressed as processor-executable computer program code and be stored on a non-transitory computer readable medium for execution by a processor. When executed by the processor, the computer program code causes the processor to perform the method 300.

The method 300 commences at block 302 where the processor receives as input one or more SQL script files, which for the type 2 transformation framework 102*b* comprises the mapping document with data transformation rules. The method 300 repeats block 302 for each SQL script file, thereby generating a transformation template for each of the SQL script files. While an SQL script file is used in this example, in at least some other embodiments different types of file that include SQL or SQL-like code may be transformed in accordance with the type 2 transformation framework 102*b*. For example, SAS or FOCUS code may include SQL-like code, and this SQL-like code may be converted using the type 2 transformation framework 102*b* as described further below.

More particularly, at block 306 for each of the SQL script files, the processor:

1. parses the SQL script file to obtain an SQL statement list (block 304);
2. automatically generates a configuration file with SQL statement and transformation type information such as Insert, Select, and Update (block 306);
3. parses the SQL statement type and converts it into Spark SQL dataframe transformation code based on the transformation type (block 308); and
4. renders a transformation template (block 310). An example transformation template is appended to the end of this disclosure as "Code Example 6".

Following block 310, the processor renders a transformation driver, utility functions, and POM templates at block 214 using the transformation templates generated for each of the target tables. Once rendered, the processor at block 216 writes a complete project package comprising the transformation driver, utility functions, and POM templates into storage. From the project package, the processor builds a project package at block 218 using, for example, the Apache Maven™ build automation tool. The output of the method 200 is source code for use in a data transformation process; example source code in FIG. 3 is Scala Spark source code. The output of block 218 may also include JAR files as discussed below in respect of FIG. 6.

Figure 6:
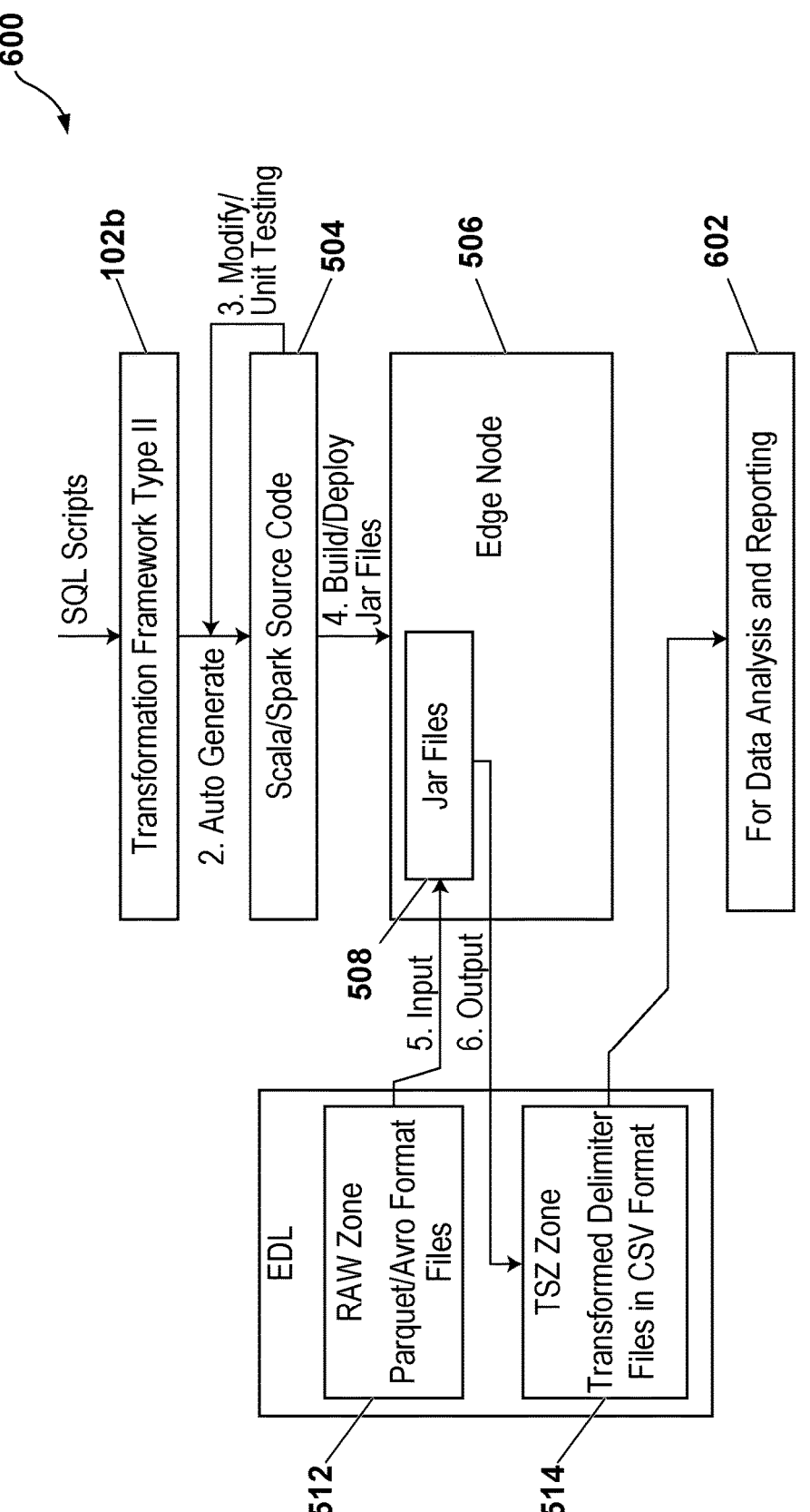

Referring now to FIG. 6, there is shown an example system 600 for performing data transformation using the source code automatically generated from the method 300 of FIG. 3.

In the system 600 of FIG. 6, the type 2 transformation framework 102*b* receives as input one or more SQL script files, and then it automatically generates Scala Spark source code 504. The type 2 transformation framework 102*b* accordingly performs the method 300 of FIG. 3 as described above. As shown in FIG. 6, unit testing may be performed on the Scala Spark source code, and the source code may also be modified if so desired.

Once the final Scala Spark source code 504 is obtained, a processor builds the project and deploys the resulting JAR files 508 to an edge node 506. The edge node 506 receives from a raw zone 512 comprising part of an EDL, which itself comprises one or more Hadoop clusters, files in Parquet or Avro format, and uses those Parquet/Avro files as input for the JAR files 508. The JAR files 508 perform a data transformation on the Parquet/Avro files and outputs transformed CSV files 510 to a TSZ zone 514 of the EDL. The CSV files 510 are then used for analysis and reporting at block 602. Alternatively, the CSV files 510 may be used in conjunction with the mainframe 516 and EDW 518 of FIG. 5; analogously, the CSV files 510 of FIG. 5 may be used for data analysis and reporting as described in respect of FIG. 6. As with FIG. 5, the transformed data files may be exported to a data warehouse and/or be retained on the EDL.

Figure 9A:
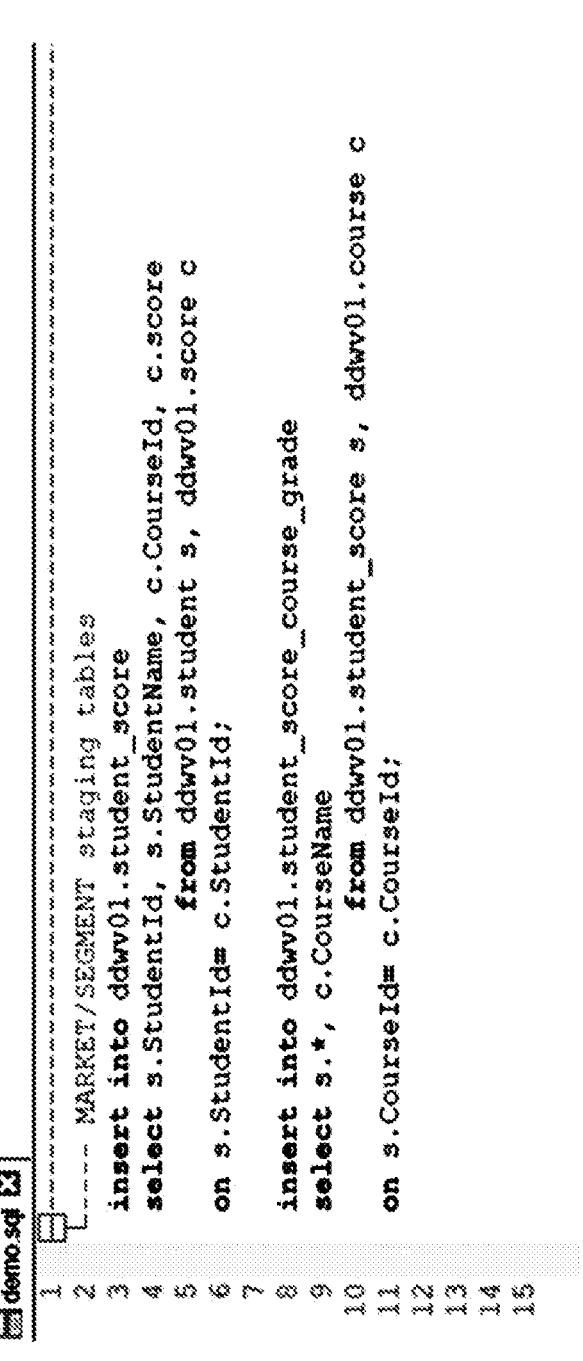

Referring now to FIGS. 9A-9E, there are shown a mapping document in the form of an SQL script file (FIG. 9A), various source files in Parquet format for data transformation (FIGS. 9B-9D), and a transformed file generated from the source file in accordance with the mapping document (FIG. 9E), respectively, according to an example embodiment using the system 600 of FIG. 6. The source files in Parquet format have been converted to CSV format so they are human readable. As shown in FIG. 9E, the resulting transformed file is a combination of the StudentId, Student-Name, CourseId, score, and CourseName entries from the source files.

An example configuration file generated in accordance with block 306 for this example is appended to the end of this disclosure as "Code Example 7", and an example transformation template generated in accordance with block 310 for this example is appended to the end of this disclosure as "Code Example 8".

Type 3 Transformation Framework

Figure 4:
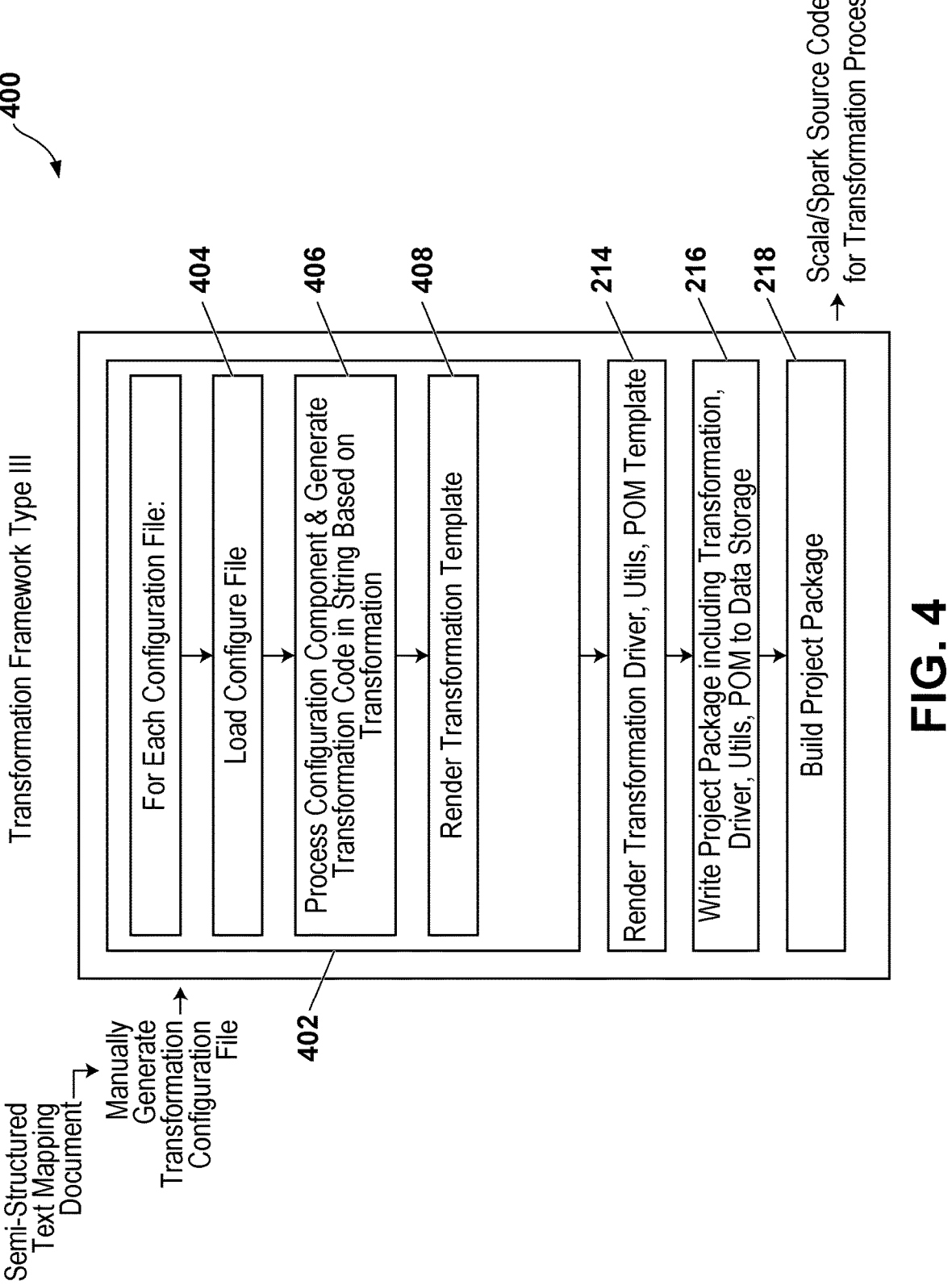

Referring now to FIG. 4, there is shown an example method 400 for performing automatic source code generation for use in a data transformation process. More particularly, the method 400 is used to implement the type 3 transformation framework 102*c*. The method 400 may be expressed as processor-executable computer program code and be stored on a non-transitory computer readable medium for execution by a processor. When executed by the processor, the computer program code causes the processor to perform the method 400.

The method 400 commences at block 402 where the processor receives as input one or more configuration files with transformation information. This configuration file is manually generated in this example from a semi-structured text mapping document, and represents the data transformation rules to be used to render a transformation template. The method 400 repeats block 402 for each of the configuration files, thereby generating a transformation template for each of the configuration files.

More particularly, at block 402 for each of the configuration files:

1. The processor loads the configuration file (block 404).
2. The processor processes the configuration file and generates transformation code in String based on transformation type stored in the configuration file (block 406).
3. The processor renders a transformation template (block 408). An example transformation template may be analogous to the one used in respect of the type 1 transformation framework 102*a*, described above.

Following block 408, the processor renders a transformation driver, utility functions, and POM templates at block 214 using the transformation templates generated for each of the target tables. These templates may be analogous to those used in respect of the type 1 transformation framework 102*a*, described above. Once rendered, the processor at block 216 writes a complete project package comprising the transformation driver, utility functions, and POM templates into storage. From the project package, the processor builds a project package at block 218 using, for example, the Apache Maven™ build automation tool. The output of the method 200 is source code for use in a data transformation process; example source code in FIG. 4 is Scala Spark source code. The output of block 218 may also include JAR files as discussed below in respect of FIG. 7.

Figure 7:
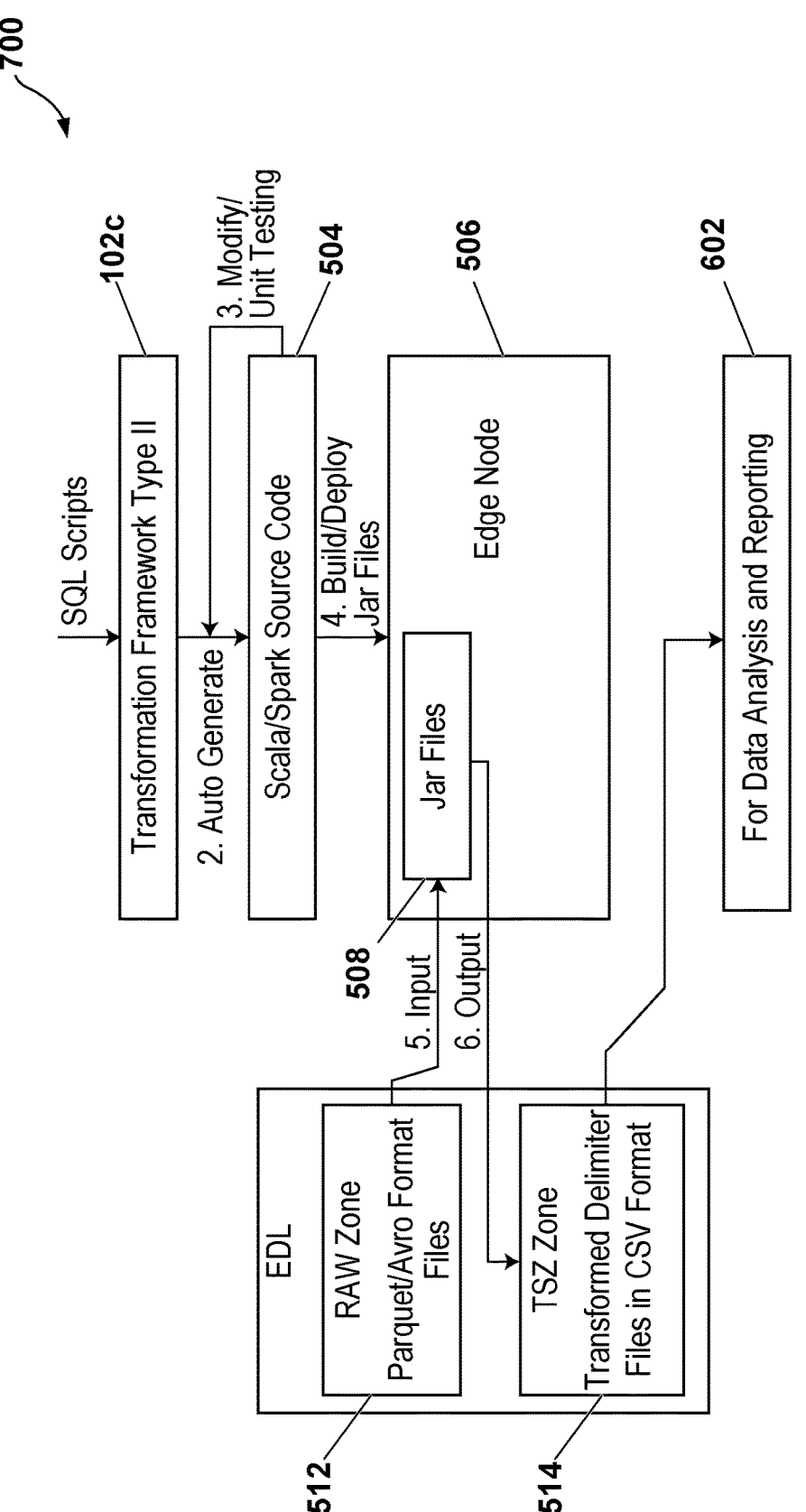

Referring now to FIG. 7, there is shown an example system 700 for performing data transformation using the source code automatically generated from the method 400 of FIG. 4.

In the system 700 of FIG. 6, the type 3 transformation framework 102*c* receives as input one or more configuration files with transformation information, which are manually generated in this example from a semi-structured text mapping document. An example configuration file is appended to the end of this disclosure as "Code Example 9".

The system 700 then automatically generates Scala Spark source code 504. The type 3 transformation framework 102*c* accordingly performs the method 400 of FIG. 4 as described above. As shown in FIG. 7, unit testing may be performed on the Scala Spark source code, and the source code may also be modified if so desired. Example Scala Spark source code used for the transformation is appended to the end of this disclosure as "Code Example 10".

Example generated driver Scala Spark source code is appended to the end of this disclosure as "Code Example 11".

Example generated utility Scala Spark source code is appended to the end of this disclosure as "Code Example 12".

Example POM source code is appended to the end of this disclosure as "Code Example 13".

The Scala Spark code may be used to transform data in a source table, such as that depicted in FIG. 10A. An excerpt from the transformed data is depicted in FIG. 10B.

Once the final Scala Spark source code 504 is obtained, a processor builds the project and deploys the resulting JAR files 508 to an edge node 506. The edge node 506 receives from a raw zone 512 comprising part of an EDL, which itself comprises one or more Hadoop clusters, files in Parquet or Avro format, and uses those Parquet/Avro files as input for the JAR files 508. The JAR files 508 perform a data transformation on the Parquet/Avro files and outputs transformed CSV files 510 to a TSZ zone 514 of the EDL. The CSV files 510 are then used for analysis and reporting at block 602. As discussed above in respect of FIGS. 5 and 6, the transformed data may be retained on the EDL and/or exported to a data warehouse.

Figure 11:
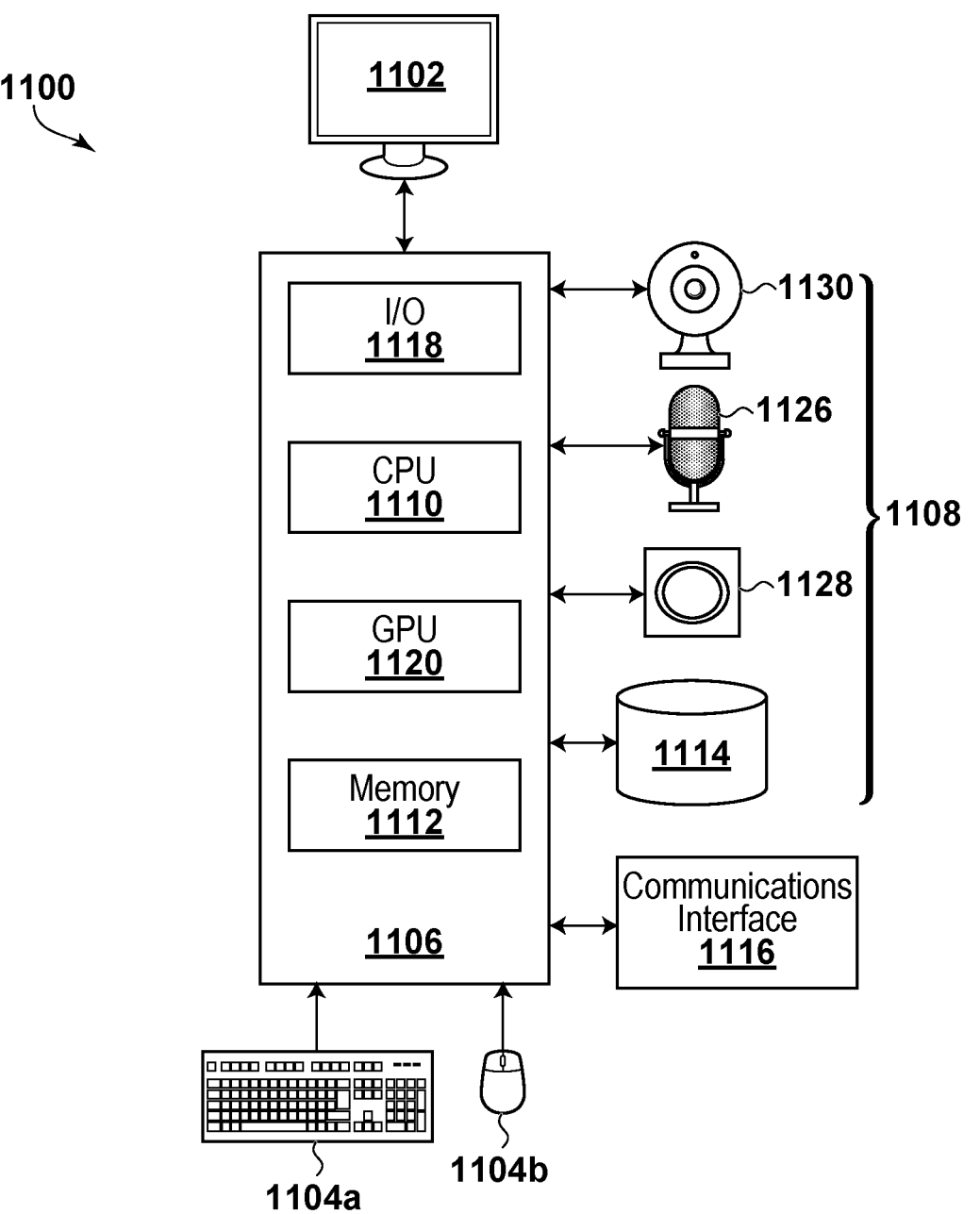
FIG. 11 depicts an example computer system that may be used to perform the methods of FIGS. 2-4, according to an example embodiment.

An example computer system in respect of which the technology herein described may be implemented is presented as a block diagram in FIG. 11. The example computer system is denoted generally by reference numeral 1100 and includes a display 1102, input devices in the form of keyboard 1104A and pointing device 1104B, computer 1106 and external devices 1108. While pointing device 1104B is depicted as a mouse, it will be appreciated that other types of pointing device, or a touch screen, may also be used.

The computer 1106 may contain one or more processors or microprocessors, such as a central processing unit (CPU) 1110. The CPU 1110 performs arithmetic calculations and control functions to execute software stored in a non-transitory internal memory 1112, preferably random access memory (RAM) and/or read only memory (ROM), and possibly additional memory 1114. The additional memory 1114 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1114 may be physically internal to the computer 1106, or external as shown in FIG. 11, or both. The additional memory 1114 may also comprise the EDL and/or EDW referenced above.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 1114 for execution by the one or more processors or microprocessors to effect neural network pre-training, training, or use of a trained network for inference.

The computer system 1100 may also include other similar means for allowing computer programs or other instructions to be loaded. Such means can include, for example, a communications interface 1116 which allows software and data to be transferred between the computer system 1100 and external systems and networks. Examples of communications interface 1116 can include a modem, a network interface such as an Ethernet card, a wireless communication interface, or a serial or parallel communications port. Software and data transferred via communications interface 1116 are in the form of signals which can be electronic, acoustic, electromagnetic, optical or other signals capable of being received by communications interface 1016. Multiple interfaces, of course, can be provided on a single computer system 1100.

Input and output to and from the computer 1106 is administered by the input/output (I/O) interface 1118. This I/O interface 1118 administers control of the display 1102, keyboard 1104A, external devices 1108 and other such components of the computer system 1100. The computer 1106 also includes a graphical processing unit (GPU) 1120. The latter may also be used for computational purposes as an adjunct to, or instead of, the (CPU) 1110, for mathematical calculations.

The external devices 1108 include a microphone 1126, a speaker 1128 and a camera 1130. Although shown as external devices, they may alternatively be built in as part of the hardware of the computer system 1100.

The various components of the computer system 1100 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a file" or "the file" does not exclude embodiments in which multiple files are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means A, B, C, A and B, A and C, B and C, or A, B, and C.

It is contemplated that any part of any aspect or embodiment discussed in this specification can be implemented or combined with any part of any other aspect or embodiment discussed in this specification, so long as such implementation or combination is not performed using mutually exclusive parts.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The following are the code examples referenced in the body of the disclosure:

The invention claimed is:

1. An automatic computer source code generation method, the method comprising:
    (a) obtaining a data file comprising data transformation rules expressed in natural language;
    (b) automatically generating, using the data transformation rules, the computer source code for use in a data transformation process to transform source data into target data, comprising:

identifying at least some of the natural language in the data transformation rules corresponding to computer source code commands; and including the computer source code commands corresponding to the identified language in the computer source code; and (c) storing the computer source code, wherein the computer source code comprises code Scala computer code for execution within a distributed data processing framework.

2. The method of claim 1, wherein the data file comprises a mapping document in the form of a spreadsheet.

3. The method of claim 2, wherein the spreadsheet specifies a source table and a source column of the source table specifying a location of the source data, and a target table and a target column of the target table specifying a location of the target data.

4. The method of claim 1, wherein the data file comprises a mapping document in the form of a Structured Query Language (SQL) script.

5. The method of claim 1, wherein the data file comprises a transformation configuration file generated from a semi-structured text mapping document.

6. The method of claim 1, wherein the computer source code comprises Java ARchive (JAR) files.

7. The method of claim 1, further comprising:

(a) obtaining from a data lake the source data for transformation from a data source, wherein the source data comprises raw data stored in the data lake; and (b) executing the computer source code on the data lake to transform the source data into the target data.

8. The method of claim 7, wherein the source data is obtained from a Hadoop data cluster.

9. The method of claim 7, further comprising storing the target data in a data warehouse.

10. The method of claim 7, wherein the source data is Parquet or Avro formatted.

11. The method of claim 7, wherein the data lake and an edge node are communicatively coupled as part of a network, and wherein the computer source code is generated on the edge node.

12. The method of claim 1, wherein the identifying is done by applying a regular expression to the data transformation rules.

13. A system comprising:

(a) at least one processor; and (b) at least one non-transitory computer readable medium, the at least one non-transitory computer readable medium having stored thereon computer program code that is executable by the at least one processor and that, when executed by the at least one processor, causes the at least one processor to perform an automatic computer source code generation method comprising:

(i) obtaining a data file comprising data transformation rules expressed in natural language;

(ii) automatically generating, using the data transformation rules, the computer source code for use in a data transformation process to transform source data into target data, comprising:

identifying at least some of the natural language in the data transformation rules corresponding to computer source code commands; and including the computer source code commands corresponding to the identified language in the computer source code; and (iii) storing the computer source code, wherein the computer source code comprises code Scala computer code for execution within a distributed data processing framework.

14. The system of claim 13, wherein the data file comprises a mapping document in the form of a spreadsheet.

15. The system of claim 13, wherein the data file comprises a mapping document in the form of a Structured Query Language (SQL) script.

16. The system of claim 13, wherein the data file comprises a transformation configuration file generated from a semi-structured text mapping document.

17. The system of claim 13, wherein the at least one processor and the at least one non-transitory computer readable medium comprise part of an edge node, and wherein the system further comprises a data lake communicatively coupled to the edge node, and wherein the computer source code is executed on the data lake to transform raw data stored in the data lake.

18. At least one non-transitory computer readable medium having stored thereon computer program code that is executable by at least one processor and that, when executed by the at least one processor, causes the at least one processor to perform an automatic computer source code generation method comprising:

(a) obtaining a data file comprising data transformation rules expressed in natural language;

(b) automatically generating, using the data transformation rules, the computer source code for use in a data transformation process to transform source data into target data, comprising:

identifying at least some of the natural language in the data transformation rules corresponding to computer source code commands; and including the computer source code commands corresponding to the identified language in the computer source code; and (c) storing the computer source code, wherein the computer source code comprises code Scala computer code for execution within a distributed data processing framework.

* * * * *